Patented Aug. 25, 1953

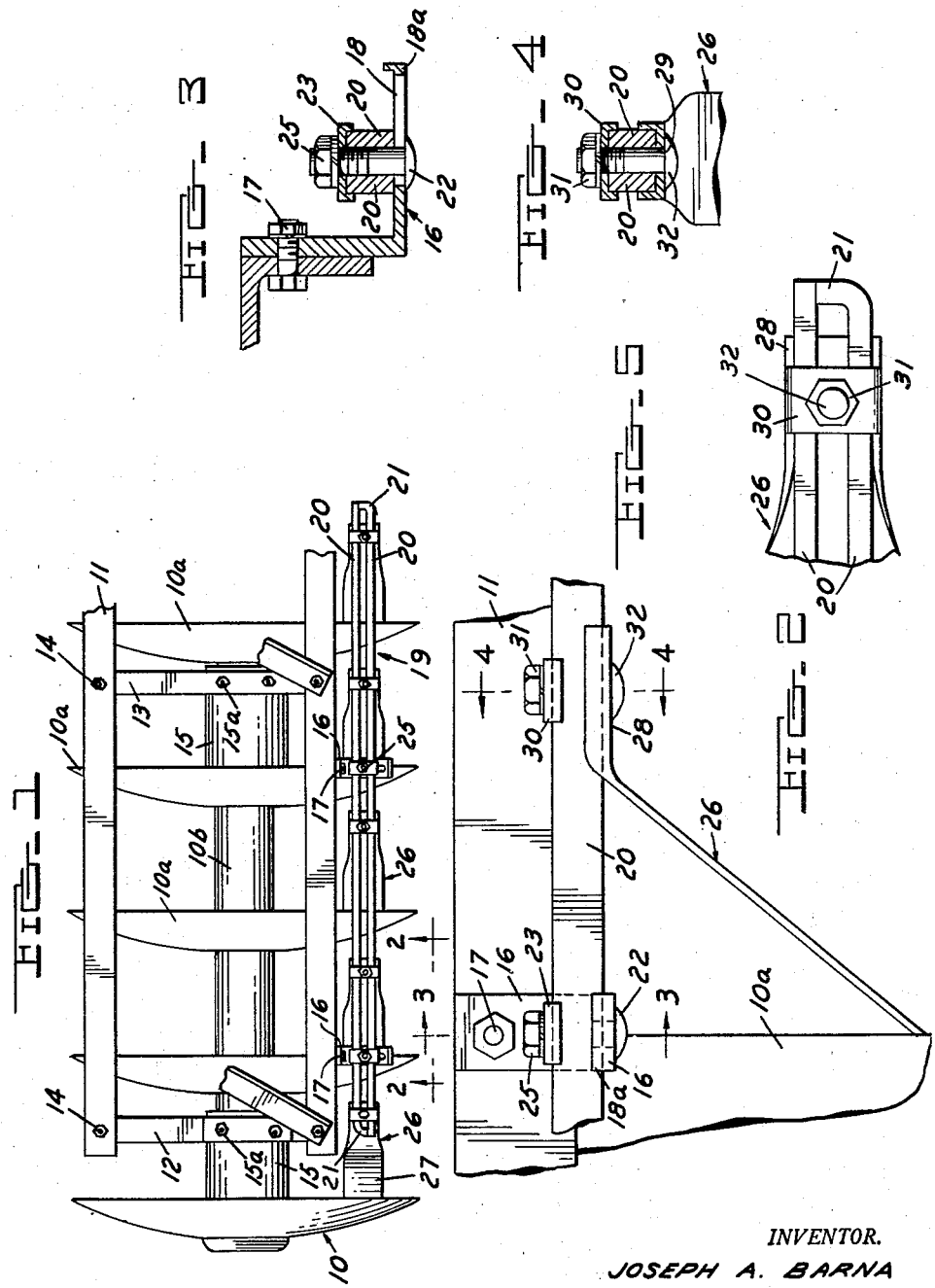

2,649,724

UNITED STATES PATENT OFFICE 2,649,724

SCRAPER SUPPORT FOR DISK TYPE IMPLEMENTS

Joseph A. Barna, Detroit, Mich., assignor to Dearborn Motors Corporation, Highland Park, Mich., a corporation of Delaware Application October 28, 1949, Serial No. 124,188

2 Claims. (Cl. 97—224)

This invention relates to an improved scraper support for disc harrows whereby the scrapers may be adjusted individually or as a group with respect to the disc gang.

Disc harrows are most commonly used for breaking up the clods and ridges formed by plowing. The soil in which such earth working implements are used is frequently sticky and may include stones or other obstructions. Obviously such a soil is abusive to any implement working therein and is particularly true of disc harrows. Scrapers are normally mounted on the frame of a disc harrow to keep the concave surface of each individual disc relatively free from sticky soil in order to maintain each disc in good working condition. When, however, the disc harrow is used in a soil having the above characteristics, the scrapers and the scraper support are subject to considerable damage from the rocks or other hard objects in the soil, generally resulting in a bending of the scraper support. Scraper supports heretofore utilized were of somewhat complicated construction such that restraightening was difficult and replacement expensive. Furthermore most known scraper supports do not permit convenient adjustment of the scrapers with respect to the discs to obtain the optimum spacing between each disc and its scraper.

Accordingly, it is an object of this invention to provide an improved scraper support for a disc harrow of unusual simplicity and economy, characterized by the utilization of a built up construction enabling the parts to be conveniently repaired if damaged.

Another object of this invention is to provide an improved scraper support for a disc harrow which provides individual adjustment of each scraper as well as longitudinal and lateral adjustment of all of the scraper blades simultaneously.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention:

On the drawings:

Figure 1 is a plan view of a disc gang of a disc harrow embodying a scraper support of this invention.

Figure 2 is an enlarged partial front elevational view taken substantially along the line 2—2 of Figure 1.

Figure 3 is a sectional view taken along the plane 3—3 of Figure 2.

Figure 4 is a cross sectional view taken along the plane 4—4 of Figure 2.

Figure 5 is an enlarged detail plan view of the end of the scraper support.

As shown on the drawings:

Briefly this invention comprises a scraper support constructed of a pair of spaced parallel bars mounted on a pair of spaced brackets secured to the frame of a disc harrow. One end of each spaced bar is bent inwardly to contact the adjacent bar and a plurality of scrapers are adjustably mounted by bolts on the parallel bars and each scraper is individually adjustable longitudinally relative to the scraper support, hence with respect to the adjacent disc of the disc gang. The spaced parallel bars are both laterally and longitudinally adjustable relative to the spaced brackets whereby all the scrapers may be adjusted with respect to their respective discs in unison.

In Figure 1 there is shown a single disc gang 10 of a conventional disc harrow. Disc gang 10 comprises a plurality of discs 10a mounted in spaced relation on a shaft 10b which is dependingly supported from an angle iron frame 11 by a pair of spaced brackets 12 and 13 secured to frame 11 by bolts 14. A bearing 15 provided on each end of shaft 10b is secured to each depending bracket 12 and 13 by bolts 15a to rotatably mounted disc gang 10.

A pair of spaced brackets 16 are secured to the trailing edge of frame 11 by bolts 17. Brackets 16 comprise essentially L-shaped members, best shown in Figure 3, and a vertically disposed slot 18 is provided in the horizontal arm 18a of the L-shaped member, such slot being transversely disposed with respect to the disc gang 10.

A scraper support 19 is mounted on brackets 16 in substantial parallelism with disc gang 10 and such support comprises a pair of spaced parallel rectangular bars 20. One end 21 of each bar 20 is bent inwardly to contact the adjacent bar 20 whereby such bars are spaced apart. Bars 20 are secured to the spaced brackets 16 by vertical bolts 22, such bolts being cooperable with slot 18 whereby bars 20 are adjustable transversely of the disc gang 10. Each bolt 22 passes upwardly between parallel bars 20 preferably in substantial contact with the inner faces of such bars to further support the bars in spaced relationship. The scraper support 19 is thus freely adjustable longitudinally relative to the disc gang. An inverted U-shaped clamp 23 straddles the top of bars 20 over each bolt 22 and a nut 25 screwed on to each bolt 22 and against the top of each clamp 23 locks bars 20 to brackets 16.

A plurality of disc scrapers 26 are adjustably mounted on scraper support 19. Scrapers 26 are of substantially conventional construction and each comprises a stamping of sheet metal having a blade portion 27 depending at an angle from a horizontal channel-shaped mounting portion 28. The mounting portion of each scraper blade is placed adjacent the underside of scraper support 19 and a vertically disposed bolt 32 is inserted through a suitable aperture 29 in the mounting portion 28 and also passes between bars 20 and through a clamp 30, similar to clamp 23, straddling the top of bars 20. A nut 31 screwed on to the threaded end of each bolt 32 secures each scraper 26 to support 19.

It is thus evident that each individual scraper 26 is adjustable longitudinally relative to scraper support 19, hence relative to its respective disc, whereby initial setting of each scraper with respect to the disc can be readily accomplished. Scraper support 19 is longitudinally adjustable with respect to the disc gang 10, as well as laterally adjustable relative thereto within the limits of slot 18, therefore, all of the scraper blades 26 may be simultaneously adjusted relative to the discs both in a longitudinal as well as in a lateral direction.

It is apparent, therefore, from the above description that there is here provided an economically fabricated scraper support which can be conveniently and readily disassembled, and whereby the elements of such support, particularly the parallel bars 20, may be easily straightened by any unskilled workman if damaged. The individual adjustment of each scraper blade with respect to the discs for initial setting of the scrapers is quickly and positively obtained. The added feature of being able to simultaneously adjust all of the scrapers in a lateral or longitudinal direction with respect to the disc gang is a decided advantage in obtaining the optimum location of the scrapers with respect to the discs whereby discs are kept relatively free of adhering material.

It will, of course, be understood that many details of construction may be varied through a wide range without departing from the principles of this invention and it is, therefore, not the purpose to limit the patent granted hereon otherwise than necessitated by the scope of the appended claims.

I claim:

1. In an earth working implement having a frame and a disc gang rotatably supported by the frame, a scraper support comprising a pair of spaced, parallel, identical, separable bars, each of said bars having one end thereof bent inwardly at substantially right angles from the longitudinal plane of the bar to extend laterally into abutment with the opposing end of the associated adjacent bar to maintain their spaced relationship, a pair of spaced brackets on the frame for mounting the bars in juxtaposition parallel to the axis of said disc gang and having slots therein lying transversely to said axis, a first means for adjustably mounting said bars on said brackets, a plurality of scraper blades, a second means for mounting said scraper blades on said bars permitting longitudinal adjustment of said blades along said bars, said first and said second mounting means each comprising a bolt passing between said parallel bars in snug engagement therewith to project therebeyond, and a clamping member receiving the projecting end of said bolt and contacting the adjacent side and edge surfaces of said bars to partially surround the same, thereby preventing spreading and separation of the individual bars but permitting individual and group adjustment of said scrapers relative to said disc gangs upon loosening said bolts without removing said clamping members from said bars.

2. In an earth working implement having a frame and a disc gang rotatably supported by the frame, a scraper support comprising a pair of spaced and parallel, identical, separable bars each having an opposite end thereof bent inwardly at substantially right angles from the longitudinal plane of the bar to extend laterally into abutment with one end of the adjacent bar to maintain their spaced relationship, a pair of U-shaped bar brackets spaced along the length of said bars and snugly receiving adjacent side and edge surfaces of said bars therebetween, said bar brackets being slidable along said bars, a pair of spaced bar supports carried by said frame and each respectively cooperating with one of said pair of bar brackets, said supports having surfaces upon which said bars are seated and slots lying transversely to the axis of rotation of said disc gang, a plurality of scraper brackets also spaced along the length of said bars and snugly receiving adjacent side and edge surfaces of said bars therebetween, said scraper brackets being slidable along said bars, a plurality of scraper blades having end supports contacting said bars and each respectively cooperating with one of said scraper brackets, and releasable attachment means projecting through each of said bar brackets and the associated cooperating bar supports and through each of said scraper brackets and the associated cooperating scraper supports, respectively, to secure the same in firm assembly, said scraper brackets being slidable along said bar to vary the spacing between adjacent scrapers, and said bars being adjustable longitudinally by sliding movement thereof relative to said bar supports and being adjustable toward and away from said disc gang by virtue of said bar support slots, the adjustments of said brackets and said bars being made by merely loosening said attachment means and without separating said bars, whereby said scrapers may be individually and simultaneously adjusted relative to said disc gang.

JOSEPH A. BARNA.

References Cited in the file of this patent

UNITED STATES PATENTS

| Number | Name | Date |
|---|---|---|
| 207,873 | Jennings | Sept. 10, 1878 |
| 411,650 | Drader | Sept. 24, 1889 |
| 633,333 | Beall | Sept. 19, 1899 |
| 1,512,258 | White | Oct. 21, 1924 |
| 1,721,876 | Davis et al. | July 23, 1929 |
| 1,746,092 | Sutton | Feb. 4, 1930 |
| 1,819,292 | Hendricks | Aug. 18, 1931 |